(12) United States Patent
Dent

(10) Patent No.: US 6,526,279 B1
(45) Date of Patent: Feb. 25, 2003

(54) COMMUNICATION SYSTEM WITH A MOBILE TERMINAL SUPPORTING MOBILE ASSISTED SIGNAL STRENGTH MEASUREMENTS FOR A PLURALITY OF NETWORKS AND METHODS FOR OPERATING THE SAME

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/372,552

(22) Filed: Aug. 11, 1999

(51) Int. Cl.[7] .................................................. H04Q 7/20
(52) U.S. Cl. ...................... 455/437; 455/443; 455/450; 455/453
(58) Field of Search ................................ 455/434, 435, 455/436, 437, 442, 443, 447, 448, 453, 550, 444, 439, 67.1

(56) References Cited

U.S. PATENT DOCUMENTS

| | | | |
|---|---|---|---|
| 5,048,059 A | | 9/1991 | Dent |
| 5,428,668 A | | 6/1995 | Dent |
| 5,491,837 A | * | 2/1996 | Haartsen ...................... 455/62 |
| 5,526,402 A | | 6/1996 | Dent et al. |
| 5,535,259 A | | 7/1996 | Dent et al. |
| 5,581,597 A | | 12/1996 | Dent et al. |
| 5,594,949 A | * | 1/1997 | Andersson et al. ........... 455/62 |
| 5,663,957 A | | 9/1997 | Dent |
| 5,778,075 A | | 7/1998 | Haartsen |
| 5,839,075 A | * | 11/1998 | Haartsen ...................... 455/450 |
| 5,857,154 A | | 1/1999 | Laborde et al. ............. 455/444 |
| 5,884,145 A | * | 3/1999 | Haartsen ...................... 455/63 |
| 5,887,260 A | | 3/1999 | Nakata ........................ 455/436 |

FOREIGN PATENT DOCUMENTS

| WO | WO97 32441 | 9/1997 |
|---|---|---|
| WO | WO98 39939 | 9/1998 |

OTHER PUBLICATIONS

Del Re et al., *The GSM Procedures in an Integrated Cellular/Satellite System*, IEEE Journal on Selected Areas in Communications, IEEE Inc., New York, vol. 13, No. 2, pp. 421–430, Feb. 1, 1995.

Copy of International Search Report for PCT/US00/21577.

M. Mouly & M. Pautet, *The GSM System for Mobile Communications*, 1992, Cell & Sys., France.

Copy of Written Opinion for PCT/US00/21577.

* cited by examiner

Primary Examiner—Edward F. Urban
Assistant Examiner—Tilahun Gesesse
(74) Attorney, Agent, or Firm—Myers Bigel Sibley & Sajovec

(57) ABSTRACT

Communication systems and methods are provided allowing a single mode mobile terminal to support mobile assisted signal strength measurement operations in both a fixed frequency reuse based communication network and an adaptive channel allocation based communication network. Candidate base station signal strength measurements are requested by a fixed frequency reuse type network, measured by the mobile terminal and provided to the fixed frequency reuse type network which is seeking to identify a strongest signal for mobile assisted handover operations. In addition, interference signal strength measurements are requested by an adaptive channel allocation type network, measured by the mobile terminal and provided to the adaptive channel allocation type network by the mobile terminal. No redundant circuitry is required in the mobile terminal. Instead, the mobile terminal executes the same operations using the same hardware regardless of whether the requested measurement is of a candidate signal strength or an interference signal.

21 Claims, 6 Drawing Sheets

COMMUNICATION SYSTEM WITH A MOBILE TERMINAL SUPPORTING MOBILE ASSISTED SIGNAL STRENGTH MEASUREMENTS FOR A PLURALITY OF NETWORKS AND METHODS FOR OPERATING THE SAME

FIELD OF THE INVENTION

This invention relates to communication systems and, more particularly, to mobile terminals operating with two or more wireless communications networks.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT450, and NMT-900, have been deployed successfully throughout the world. More recently, digital cellular radiotelephone systems such as that designated as IS-54B (and its successor IS-136) in North America and the pan-European GSM system have been introduced. These systems, and others, are described, for example, in the book titled *Cellular Radio Systems* by Balston, et al., published by Artech House, Norwood, Mass., 1993. In addition, satellite based radio communication systems are also being utilized to provide wireless communications in various regions such as the Asian Cellular Satellite System (ACeS) generated by Lockheed Martin Corporation. Furthermore, dual-mode mobile terminals are known which allow a single terminal to access to different networks. For example, an analog/digital dual-mode terminal or a terrestrial/satellite dual-mode terminal may be desirable in various geographic areas to maximize the communications capabilities available to a user.

FIG. 1 illustrates a conventional terrestrial wireless communication system 20 that may implement one of the aforementioned wireless communication standards. The wireless system may include one or more wireless mobile terminals 22 that communicate with a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile terminals 22.

The cells 24 generally serve as nodes in the communication system 20, from which links are established between wireless mobile terminals 22 and a MTSO 28, by way of the base stations 26 servicing the cells 24. Each cell 24 will have allocated to it one or more dedicated control channels and one or more traffic channels. The control channel is a dedicated channel used for transmitting cell identification and paging information. The traffic channels carry the voice and data information. Through the communication system 20, a duplex radio communication link 30 may be effected between two wireless mobile terminals 22 or between a wireless mobile terminal 22 and a landline telephone user 32 via a public switched telephone network (PSTN) 34. The function of the base station 26 is commonly to handle the radio communications between the cell 24 and the wireless mobile terminal 22. In this capacity, the base station 26 functions chiefly as a relay station for data and voice signals.

FIG. 2 illustrates a conventional celestial wireless communication system 40. The celestial wireless communication system 40 may be employed to perform similar functions to those performed by the conventional terrestrial wireless communication system 20 of FIG. 1. In particular, the celestial wireless communication system 40 typically includes one or more satellites 42 that serve as relays or transponders between one or more earth stations 44 and satellite wireless mobile terminals 23. The satellite 42 communicates with the satellite wireless mobile terminals 23 and earth stations 44 via duplex communication links 46. Each earth station 44 may, in turn, be connected to a PSTN 34, allowing communications between the wireless mobile terminals 23 and conventional landline telephones 32 (FIG. 1).

The celestial wireless communication system 40 may utilize a single antenna beam covering the entire area served by the system, or as shown in FIG. 2, the celestial wireless communication system 40 may be designed such that it produces multiple, minimally-overlapping beams 48, each serving a distinct geographical coverage area 50 within the system's service region. A satellite 42 and coverage area 50 serve a function similar to that of a base station 26 and cell 24, respectively, of the terrestrial wireless communication system 20.

Thus, the celestial wireless communication system 40 may be employed to perform similar functions to those performed by conventional terrestrial wireless communication systems. In particular, a celestial radiotelephone communication system 40 has particular application in areas where the population is sparsely distributed over a large geographic area or where rugged topography tends to make conventional landline telephone or terrestrial wireless infrastructure technically or economically impractical.

Traditional analog radiotelephone systems generally employ a system referred to as frequency division multiple access (FDMA) to create communications channels. As a practical matter well-known to those skilled in the art, radiotelephone communications signals, being modulated waveforms, typically are communicated over predetermined frequency bands in a spectrum of carrier frequencies. These discrete frequency bands serve as channels over which cellular radiotelephones communicate with a cell, through the base station or satellite serving the cell. In the United States, for example, Federal authorities have allocated to cellular communications a block of the UHF frequency spectrum further subdivided into pairs of narrow frequency bands, a system designated EIA-553 or IS-19B. Channel pairing results from the frequency duplex arrangement wherein the transmit and receive frequencies in each pair are offset by 45 Mhz.

A defined range of radio channels are allocated to cellular mobile communications in the United States. The limitations on the number of available frequency bands present several challenges as the number of subscribers increases. Increasing the number of subscribers in a cellular radiotelephone system generally requires more efficient utilization of the limited available frequency spectrum in order to provide more total channels while maintaining communications quality. This challenge is heightened because subscribers may not be uniformly distributed among cells in the system. More channels may be needed for particular cells to handle potentially higher local subscriber densities at any given time. For example, a cell in an urban area might conceivably contain hundreds or thousands of subscribers at any one time, easily exhausting the number of frequency bands available in the cell.

For these reasons, conventional cellular systems employ frequency reuse to increase potential channel capacity in each cell and increase spectral efficiency. Fixed frequency reuse involves allocating frequency bands to each cell, with cells employing the same frequencies geographically separated to allow radiotelephones in different cells to simultaneously use the same frequency without interfering with each other. By so doing, many thousands of subscribers may be served by a system of only several hundred frequency bands.

An alternative approach to fixed frequency reuse (with or without frequency hopping) is adaptive channel allocation (ACA). In ACA networks, the available channels are typically dynamically allocated throughout the network to maximize system capacity rather than defining a specific subset of the available channels for each cell within the network. The allocation may be based on measurements made by the mobile of channels (or frequencies) which are potential sources of interference signals as contrasted with the selection of candidate channels for handoff as provided with mobile assisted handoff in some fixed frequency reuse networks. These measurements are made to determine the level of interference signals on the various channels. The interference signal measurements may, in turn, be used to select a channel which may provide, for example, acceptable performance at the lowest transmission power level. Examples of such systems are further described in U.S. Pat. No. 5,491,837, which is incorporated herein by reference in its entirety.

U.S. Pat. No. 5,839,075 to Haartsen and Dent, which is incorporated herein by reference, describes yet another method of using measurements made by the mobile phone to assist channel allocation. The system described therein concerns a so-called "home base station" which allows a cellular phone to be used as a domestic cordless phone when at home or as a mobile phone when not at home. The problem discussed and solved therein relates to obtaining a cellular frequency for the home base station's use that is not a cellular frequency used by the cellular system in the area in which the home base station is installed. The cellular phone may be parked in the home base station "cradle" when not in use, which also serves to charge its battery. The physical connection of the two units allows the home base station to control the cellular phone receiver to search the cellular channels and then picks a channel with a low signal strength, indicating that it may not be used by the cellular system close by. The problem solved by the method of this patent is not the same as the problem addressed in the current application, as the home base station is not part of a network using ACA but a single, independent station. Moreover, reports of mobile measurements cannot be conveyed using the normal mobile assisted handover (MAHO) mechanism as this would typically have required radio contact already to have been established between the home base station and the phone. Thus, the problem solved in this patent is not the same as ACA for allocating a base station and a channel of a cellular network to serve a particular call, based on measurements which the cellular phone is allowed to transmit by radio to the cellular network.

Another technique which may further increase channel capacity and spectral efficiency is time division multiple access (TDMA). A TDMA system may be implemented by subdividing the frequency bands employed in conventional FDMA systems into sequential time slots. Although communication on frequency bands typically occur on a common TDMA frame that includes a plurality of time slots, communications on each frequency band may occur according to a unique TDMA frame, with time slots unique to that band. Examples of systems employing TDMA are the dual analog/digital IS-54B standard employed in the United States, in which each of the original frequency bands of EIA-553 is subdivided into 3 time slots, and the European GSM standard, which divides each of its frequency bands into 8 time slots (or burst periods) which define a frame. In these TDMA systems, each user communicates with the base station using bursts of digital data transmitted during the user's assigned time slots.

A channel in a TDMA system typically includes one or more time slots on one or more frequency bands. As discussed above, traffic channels are used to communicate voice, data or other information between users, for example, between a mobile terminal such as a radiotelephone and a landline telephone. In this manner, each traffic channel forms one direction of the duplex communications link established by the system from one user to another. Traffic channels typically are dynamically assigned by the system when and where needed. In addition, systems such as the European GSM system, may "frequency hop" traffic channels, i.e., randomly switch the frequency band on which a particular traffic channel is transmitted. Frequency hopping reduces the probability of interference events between channels, using interferer diversity and averaging to increase overall communications quality. However, while frequency hopping might allow denser reuse of control channel frequency bands, it often is not employed because an unsynchronized radiotelephone generally would have difficulty capturing a frequency-hopped control channel due to lack of a reference point for the frequency hopping sequence employed.

Typically included in the dedicated control channels transmitted in a cell are forward control channels which are used to broadcast control information in a cell of the wide area cellular network to radiotelephones which may seek to access the network. The control information broadcast on a forward control channel may include such things as the cell's identification, an associated network identification, system timing information and other information needed to access the wide area cellular network from a radiotelephone. Forward control channels, such as the Broadcast Control Channel (BCCH) of the GSM standard, typically are transmitted on a dedicated frequency band in each cell. A radiotelephone seeking access to a system generally "listens" to a control channel in standby mode, and is unsynchronized to a base station or satellite until it captures a base station or satellite control channel.

Assignment of a mobile terminal to a communication channel in a network and handoff (or handover) of a registered mobile terminal between base stations of networks employing frequency reuse (with or without frequency hopping) as well as those using ACA may be based, in part, on measurements made by the mobile terminal. A mobile terminal (cellular phone) in such a network typically includes a radio receiver including an antenna for receiving signals and an amplifier/detector for generating a measure of the strength of received signals or noise. A signal strength measure, commonly known as Radio Signal Strength Indication (RSSI), may be expressed as a logarithmic measure of received signal strength (as discussed in U.S. Pat. No. 5,048,059, which is hereby incorporated by referenced herein in its entirety) and may be converted to a digital form by an analog to digital converter.

It is known in the prior art that radio signal strength measurements can be useful in determining which base station should serve a cellular phone and/or which channel should be used for communications during a call in both fixed frequency reuse and ACA networks. For example, cellular phones using a TDMA method conforming to either the European cellular standard known as GSM or either of the American TDMA standards known respectively as D-AMPS or PCS1900 may use spare time between transmit and receive timeslots to change frequency and monitor the signal strengths of other base stations. Several measurements of signal strength are typically averaged for the same base station. The averages are reported to the currently serving base station, which determines if a handoff should be made to another, stronger base station. In contrast, an adaptive channel allocation GSM system may obtain interference signal measurements from the mobile terminal for use in channel allocation.

Dual mode mobile terminals have been proposed which are able to operate with two (or more) different types of networks. Examples of various such devices using dual circuitry in a single handset are provided in U.S. Pat. No. 5,668,837 (GSM/AMPS) and U.S. Pat. No. 5,663,957 (terrestrial/cellestial). An alternative approach for providing service from a public and a private network is discussed in U.S. Pat. No. 5,428,668. Nonetheless, a problem with existing single mode mobile terminals is that they are generally used only in a particular type of network. Accordingly, as alternative providers enter a service area or a user moves to different geographic regions where different types of networks are in use, the ability to support mobile assisted operations may be limited.

SUMMARY OF THE INVENTION

It is, therefore, an object of the present invention to provide a communications system which may allow a single mode mobile terminal to operate in different types of communication networks.

In order to provide for the foregoing and other objectives, a method is provided allowing a single mode mobile terminal to support mobile assisted signal strength measurement operations in both a fixed frequency reuse based communication network and an adaptive channel allocation based communication network. Candidate base station signal strength measurements are requested by a fixed frequency reuse type network, measured by the mobile terminal and provided to the fixed frequency reuse type network which is seeking to identify a strongest signal for mobile assisted handover operations. In addition, interference signal strength measurements are requested by an adaptive channel allocation type network, measured by the mobile terminal and provided to the adaptive channel allocation type network by the mobile terminal. No redundant circuitry is required in the mobile terminal. Instead, the mobile terminal executes the same operations using the same hardware regardless of whether the requested measurement is of a candidate signal strength or an interference signal.

In one embodiment of the present invention, a method is provided for communicating between a mobile terminal and both a first wireless communication network and a second wireless communication network. The mobile terminal receives over a control channel of the first wireless communication network an identification of a candidate channel for handoff and determines an associated signal strength of the candidate channel. The determined associated signal strength of the candidate channel is transmitted by the mobile terminal to the first wireless communication network. The mobile terminal further receives over a control channel of the second wireless communication network an identification of a plurality of interference channels and determines associated signal strengths for the plurality of interference channels. The determined associated signal strengths of the plurality of interference channels are transmitted by the mobile terminal to the second wireless communication network.

In a further embodiment of the present invention, an identification of a plurality of candidate channels corresponding to channels used by selected base stations of the first wireless communication system is received by the mobile terminal and associated signal strengths of the plurality of candidate channels are determined by the mobile terminal. The associated signal strengths of the plurality of candidate channels are then transmitted to the first communication network. The selected base stations may be base stations in the vicinity of a base station of the first wireless communication network which transmitted the identification of a plurality of candidate channels received by the mobile terminal. The first wireless communication network in one embodiment is a GSM network using at least one of fixed frequency re-use or frequency hopping.

In another embodiment of the present invention, an identification of a plurality of interference channels corresponding to channels allocated to the second wireless communication network which are currently unused by selected base stations of the second wireless communication network is received by the mobile terminal. The selected base stations of the second wireless communication network may be base stations in the vicinity of a base station of the second wireless communication network which transmitted the identification of a plurality of interference channels received by the mobile terminal. The second wireless communication network may be a GSM network using adaptive channel allocation and the first wireless communication network may be a GSM network using at least one of fixed frequency re-use or frequency hopping.

In a further embodiment of the present invention, the receiving operations of the mobile terminal are carried out using a common receiver of the mobile terminal and the determining steps are carried out using a common signal strength measurement circuit of the mobile terminal and the transmitting steps are carried out using a common transmitter of the mobile terminal.

In a further aspect of the present invention, the first wireless communication network transmits the identification of a plurality of candidate channels and receives the transmitted associated signal strengths. The first wireless communication network then selects one of the selected base stations of the first wireless communication network to provide communication support for the mobile terminal based on the received associated signal strengths. One of the selected base stations of the first wireless communication network having the strongest associated signal strength is preferably selected to provide communications service for the mobile terminal. In addition, the second wireless communication network may transmit the identification of a plurality of interference channels and receive the transmitted associated signal strengths of the plurality of interference channels. The second wireless communication network may then select a channel of the second wireless communication network to provide communications service for the mobile terminal based on the received associated signal strengths of the plurality of interference channels.

In a system aspect of the present invention, a communication system is provided including a first and second wireless communication network and a mobile terminal. The first wireless communication network includes a plurality of base stations and a means for transmitting an identification of a plurality of candidate channels associated with the plurality of base stations. The first wireless communication network further includes a means for receiving associated signal strengths of the plurality of candidate channels from a mobile terminal and a means for selecting one of the plurality of base stations of the first wireless communication network to provide communication support for the mobile terminal based on the received associated signal strengths of the plurality of candidate channels. The second wireless communication network includes a means for transmitting an identification of a plurality of interference channels, a means for receiving associated signal strengths of the plurality of interference channels from the mobile terminal and a means for selecting a channel of the second wireless communication network to provide communication support for the mobile terminal based on the received associated signal strengths of the plurality of interference channels.

The mobile terminal includes a means for receiving over a control channel of the first wireless communication network the identification of a plurality of candidate channels associated with the plurality of base stations and for determining the associated signal strengths of the plurality of candidate channels. The mobile terminal further includes a means for transmitting the determined associated signal strengths of the plurality of candidate channels to the first wireless communication network. The mobile terminal also includes a means for receiving over a control channel of the second wireless communication network the identification of a plurality of interference channels and for determining the associated signal strengths of the plurality of interference channels and transmitting the associated signal strengths of the plurality of interference channels to the second wireless communication network.

The second wireless communication network may be a GSM network using adaptive channel allocation and the first wireless communication network may be a GSM network using at least one of fixed frequency re-use or frequency hopping.

Accordingly, the present invention provides systems and methods which may allow operation of a single mode terminal supporting different types of mobile assisted signal strength measurements for two or more different communication networks.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods or devices. Accordingly, the present invention may take the form of a hardware embodiment, a software embodiment or an embodiment combining software and hardware aspects.

Figure 1:
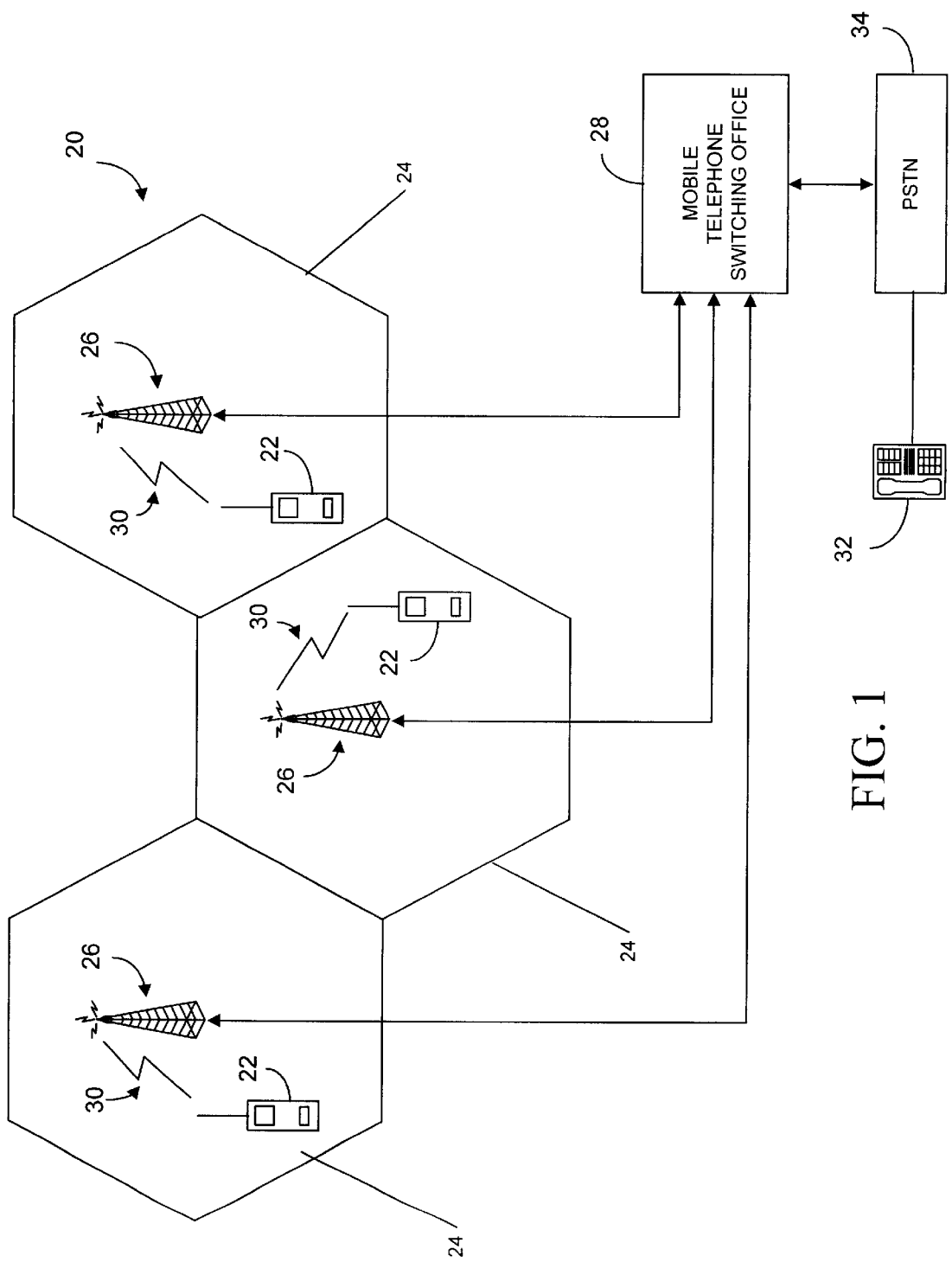
FIG. 1 schematically illustrates a portion of a wide area cellular network including a plurality of base stations servicing different geographic areas.
Figure 2:
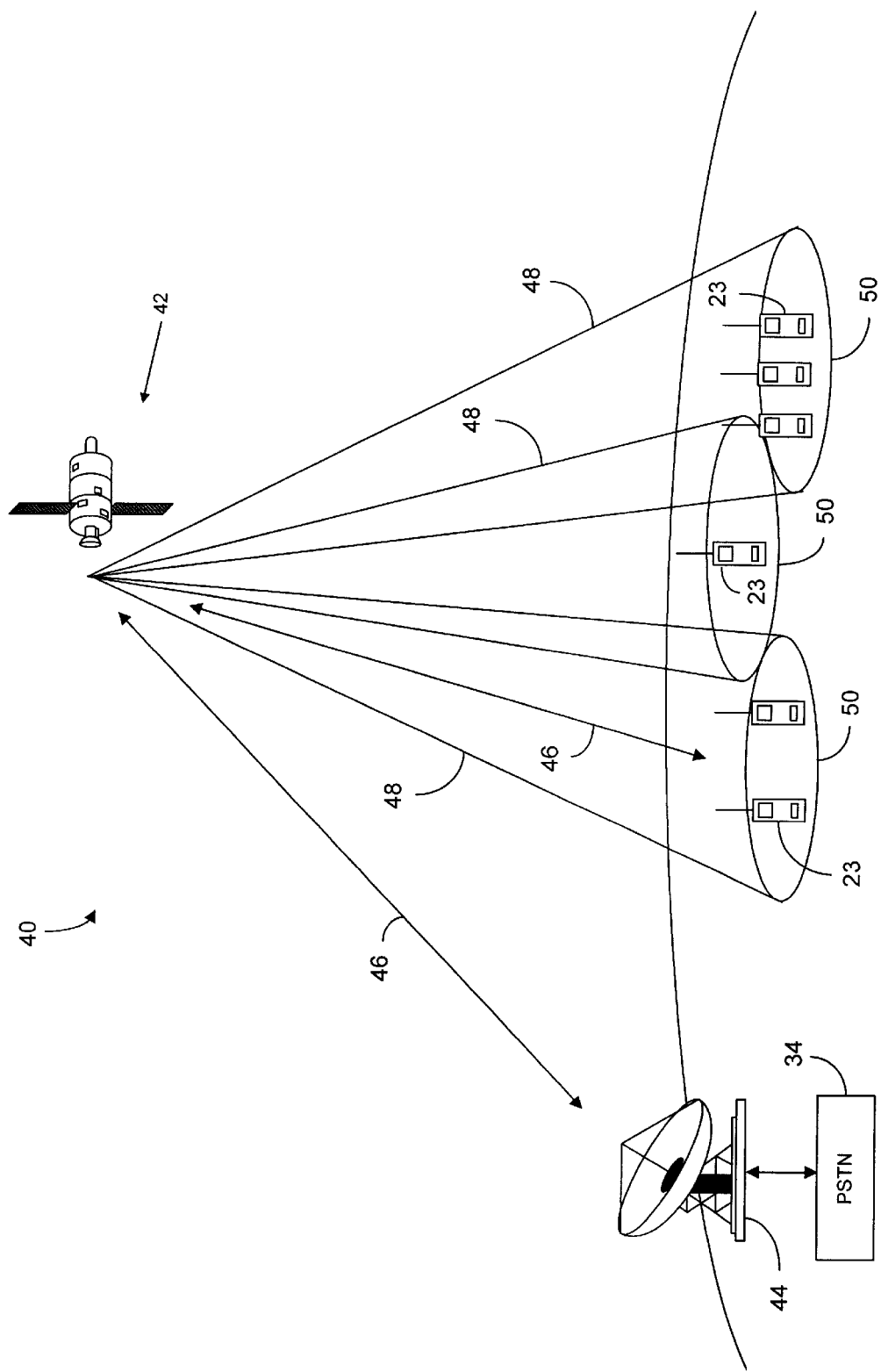
FIG. 2 schematically illustrates a portion of a satellite based wide area cellular network having spot beams covering different geographic areas.
Figure 3:
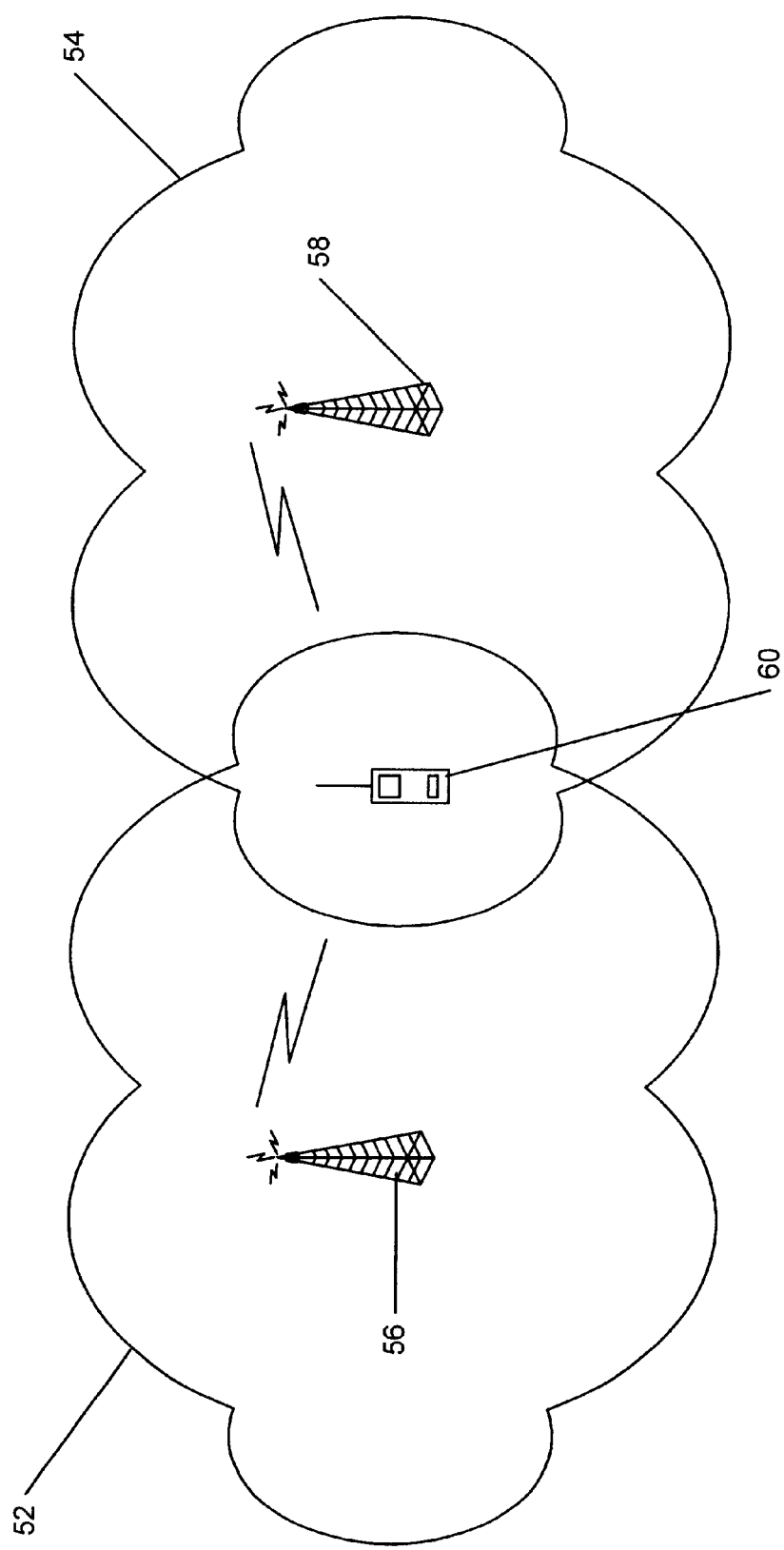
FIG. 3 schematically illustrates an operating environment of the present invention where the two communication networks are terrestrial networks which have an overlapping coverage area.

As illustrated in the embodiment shown in FIG. 3, the communication system of the present invention includes a mobile terminal 60, a first communication network 52 and a second communication network 54. The communication networks are terrestrial networks. An illustrative base station 56 is shown which is part of the cellular network of the first communication network 52. Similarly an illustrative base station 58 is shown which is part of the cellular network of the second communication network 54. However, as with the illustration of FIG. 1, it is to be understood that the communication networks 52, 54 may comprise a plurality of such base stations 56, 58 as well as mobile telephone switching centers, base station controllers and other known components.

Each communication network 52, 54 provides service to a geographic region. As shown in FIG. 3, the geographic coverage region of the communication network 52 overlaps the geographic coverage region of the communication network 54. However, it is to be understood that the present invention is not so limited and may also apply to fully overlapping networks and networks with no coverage overlap. Furthermore, the mobile terminal 60 may be within the coverage regions of one, both or neither of the communication networks 52, 54 at various times. In FIG. 3, the mobile terminal 60 is shown within the coverage regions of both communication networks 52, 54.

Each of the communication networks 52, 54 in the illustrated embodiment are cellular networks which broadcast system information over a control channel wherein the system information may include an identification of the communication network or other control information. According to the present invention, the system information of the first communication network 52 includes an identification of candidate channels for handoff of communications between the mobile terminal 60 and the first communication network 52. The system information of the second communication network 54 includes an identification of interference channels which may affect communications between the mobile terminal 60 and the second communication network 54.

The communications networks 52, 54 may be, for example, AMPS cellular radiotelephone systems or GSM cellular radiotelephone systems. Although specific examples of the terrestrial communications system are given above, it should be understood that other systems which provide analogous information are within the scope of the present invention including both satellite and terrestrial systems. Operations of the present invention will be described primarily herein with reference to mobile terminal operations where the first communication network 52 is a GSM network using fixed frequency reuse and the second communication network 54 is a GSM network using adaptive channel allocation. However, the benefits of the present invention may also be realized with mobile terminals which operate in other terrestrial systems such as those conforming with the IS-136 standard. The invention may also be applied to single mode satellite system mobile terminals where the communication networks 52, 54 are satellite networks conforming with satellite based standards such as those described in U.S. Pat. No. 5,663,957 in which only one of the networks 52, 54 uses adaptive channel allocation.

Figure 4:
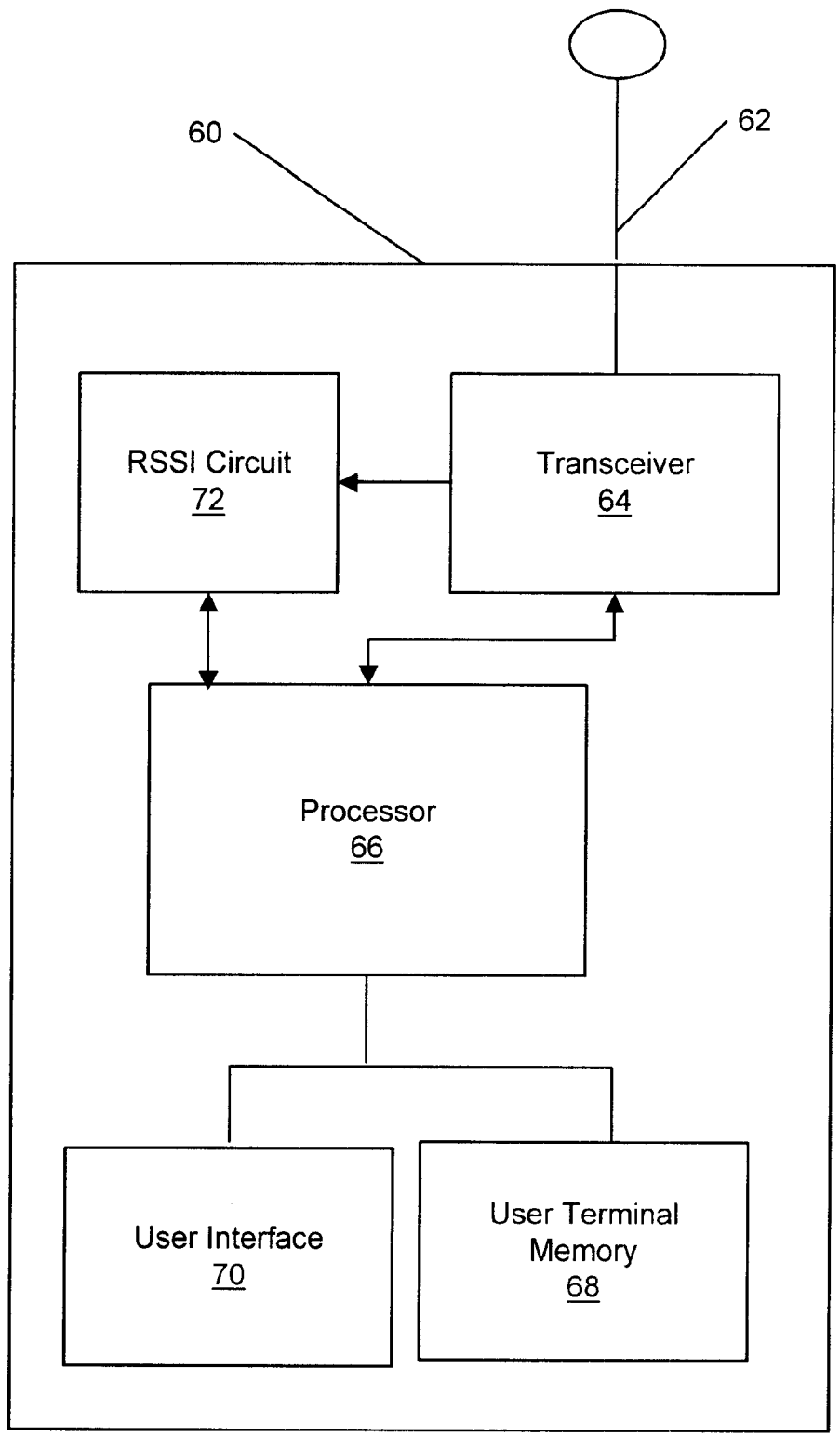
FIG. 4 is a block diagram of a mobile terminal according to an embodiment of the present invention as illustrated in FIG. 3.

Referring now to the embodiment illustrated in FIG. 4, the mobile terminal 60 of the present invention will be further described. The mobile terminal 60 is a radiotelephone, capable of communicating and registering with both communication networks 52, 54. The user terminal 60 may operate to support candidate channel signal strength measurements responsive to requests from the first communication network 52 and interference signal strength measurements responsive to requests from the second communication network 54 depending upon which network 52, 54 it is registered with at a given time.

The mobile terminal 60 includes an antenna 62 and a transceiver 64 or other transceiver means for transmitting and receiving communications to/from the networks 52, 54. In other words, the single transceiver 64 provides a receiving means and a transmitting means for both networks 52, 54 as contrasted with a dual mode terminal having separate circuits for each mode. The processor 66 accepts and provides information to and from the transceiver 64 such as information transmitted over a control channel by the communication networks 52, 54. The mobile terminal memory 68 stores information related to communication operations. The user interface 70 may include a key pad by which the user may control the operation of the mobile terminal 60.

The user interface 70 provides both an input and an output means. The interface 70, according to one embodiment of the present invention, includes display means. The interface 70 may further include an input means, such as a keyboard, for receiving input from the user specifying one of the first or second networks to be used for communications. The processor 66, in this embodiment, includes means for controlling the transceiver 64 so as to communicate over a user specified one of the first or second networks.

As shown in FIG. 4, the mobile terminal 60 further includes RSSI circuit 72 or other means for determining signal strength of a signal received from transceiver 64. The processor 66 designates the desired channel for signal strength measurement to transceiver 64 which, in turn, provides the received signal to RSSI circuit 72. As will be described further in connection with FIG. 6 below, the RSSI circuit 72 makes signal strength measurements for a plurality of channels and provides the signal strength measurements to the processor 66. The processor 66, in turn, provides the measured signal strengths to transceiver 64 or other means for transmitting the determined associated signal strengths of the requested channels to either the first communication network 52 or the second communication network 54 depending upon which network has requested measurements.

While the RSSI circuit 72 is illustrated in FIG. 4 as a separate block from the processor 66, it is to be understood that the RSSI circuit 72 may be implemented in software on the processor 66. Accordingly, the processor 66 may itself provide means for determining signal strengths of selected channels. Furthermore, as either communication network 52, 54 typically may request a plurality of different signal strength measurements, which measurements are not actually made by the mobile terminal 60 until a subsequent appropriate time, the identifications of the plurality of channels for which measurements are requested may be received by transceiver 64 and provided to processor 66 which, in turn, may store the list of channels requiring measurements in user terminal memory 68 until such time as the measurements may be completed. Similarly, the measurements may be accumulated in mobile terminal 60 and provided to the respective communications networks 52, 54 at a subsequent time as a group rather than as each measurement is completed. Accordingly, the processor 66 may maintain the signal strength measurements from the RSSI circuit 72 in user terminal memory 68 until such time as they have been successfully transmitted to the requesting communication network 52, 54.

Figure 5:
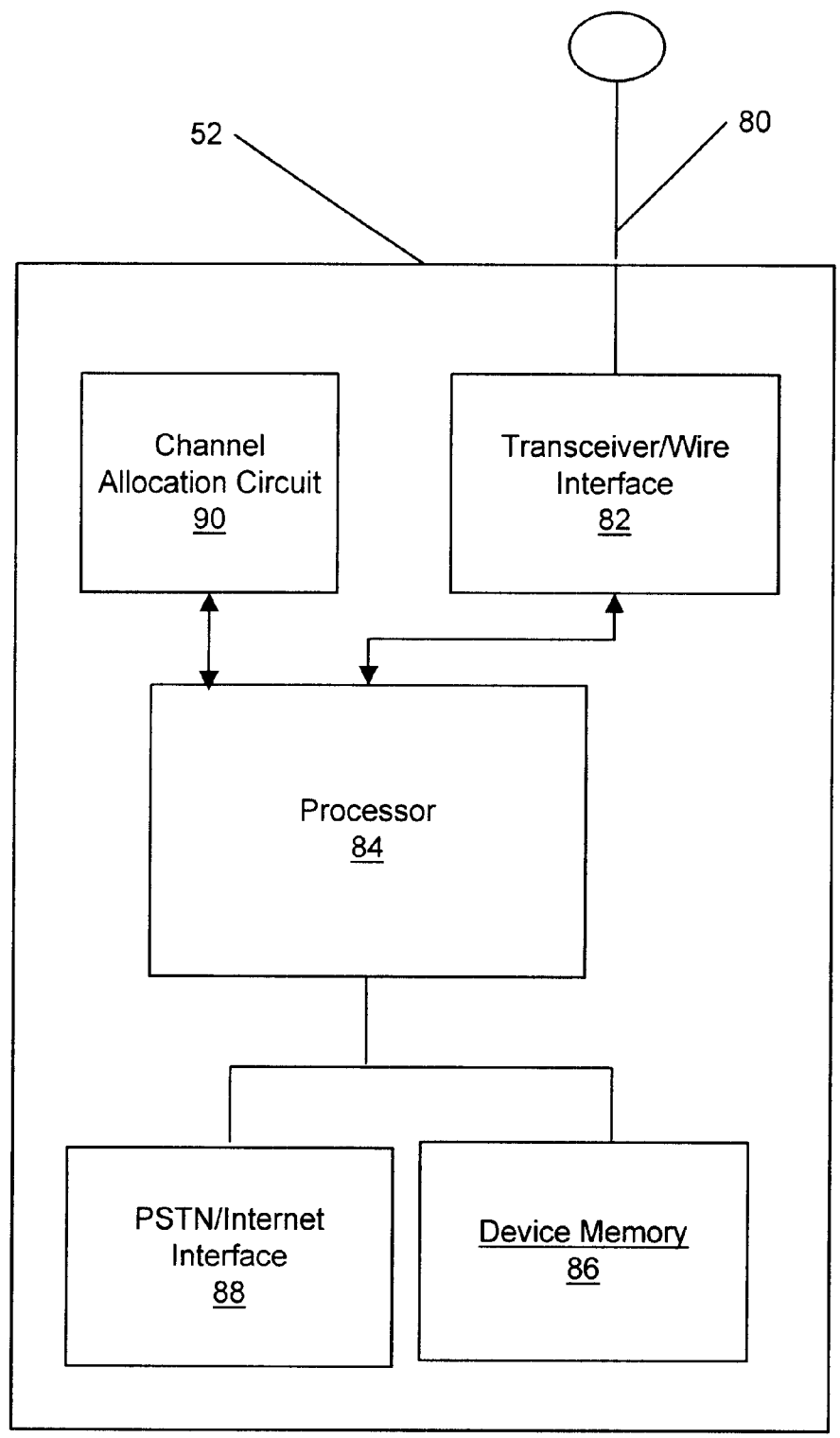
FIG. 5 is a block diagram of a communication network according to an embodiment of the present invention as illustrated in FIG. 3.

Referring now to FIG. 5, an embodiment of the first communication network 52 is schematically illustrated. The communication network 52 includes an antenna 80 or other means for receiving a wireless signal from a mobile terminal 60. The received signal is provided to transceiver/wire interface 82. It is to be understood that, while the communication network 52 is illustrated schematically as a single block in FIG. 5, it typically will include a number of separate elements which are geographically disbursed such as a base station antenna, a base station controller and a mobile station controller or telephone switching center. Accordingly, while the base station antenna will typically receive communications from the mobile terminal 60 in a wireless form over an antenna 80, it is to be understood that the downstream communications to other components, including the components which control channel allocation for the network 52, may be provided over wire networks rather than wireless communications. Accordingly, interface 82 is intended to encompass both wireless and wired interfaces of respective components within the communication network 52. The remaining components of the illustrated embodiment of the communication network 52 are preferably all located at the device in the communication network responsible for making channel allocation determinations such as a mobile switching center.

The communication network 52 further includes at least one processor 84 for controlling communication operations of the communication network 52 including the allocation of channels to various mobile terminals 60 for communication with the communication network 52. The public switched telephone network (PSTN) or Internet interface 88 provides a connection from the network 52 to the public communication system at large. Furthermore, also illustrated in the embodiment of FIG. 5 is a device memory 86 which is accessible to the processor 84 to support it in its communication control operations.

A channel allocation circuit 90 is also illustrated in the embodiment of FIG. 5. The channel allocation circuit 90 provides a means for selecting one of the base stations 56 of the first communication network 52 to provide communication support for the mobile terminal 60 based on signal strength measurements received from the mobile terminal 60. The channel allocation circuit 90 functions may be performed by a device called a Base Station Controller (BSC). It is to be understood that, while the channel allocation circuit 90 is illustrated as a separate block from the processor 84 in FIG. 5, the channel allocation circuit 90 may be implemented as code executing on the processor 84 in accordance with the present invention.

The channel allocation circuit 90 receives signal strength (quality) measurements from mobile terminal 60 responsive to requests for measurements from the communication network 52 which specified candidate channels for handoff associated with various base stations 56 of the first communication network 52. The detected signal strength measurements are received by interface 82 and provided to channel allocation circuit 90. Channel allocation circuit 90 preferably includes means for initiating handoff of a traffic connection responsive to the received signal strength measurements when the measurements satisfy a predetermined switching criteria. It is to be understood that the circuitry for assessing quality measurements and making a determination on handoff includes means to assess different signals and select between alternative base stations 56 thereby supporting mobile assisted handoff operations. Signal strength measurements from a plurality of alternative base stations 56 may be received and considered in making a decision on handoff. Each of these signals may be compared to the detected signal quality of the current connection in determining whether handoff should be initiated.

The second communication network 54 is comparable in structure to the description above for items 80, 82, 84, 86, and 88 of the first communication network 52. However, the operations of channel allocation circuit 90 differ for the second communication network 54 in that they apply adaptive channel allocation techniques. Accordingly, for the second communication network 54, the channel allocation circuit 90 would utilize interference signal measurements by the mobile terminal 60 as well as various measurements made by base stations of the second communication network 54 in calculating carrier or signal to interference ratios for use in selecting channels to be allocated to particular communication connections within the second communication network 54.

In some TDMA standards, for example, in the standard known as IS54/136 or D-AMPS, mobile signal measurements that in the prior art were made for Mobile Assisted Handoff purposes may be made with a repetition period specified by the network. The averaging time constant to be used to smooth measurements made on fading signals may also be specified by the network. Thus, a network using ACA to operate with mobiles of such a design that may immediately previously have been operating in a network using fixed frequency re-use would preferably command the mobiles to reprogram the measurement intervals or averaging periods to values optimized for making interference measurements rather than leaving the parameters as they were programmed by the previous network, that is optimized for making wanted signal measurements. Consequently, one embodiment of the invention comprises a network using Adaptive Channel Allocation that transmits commands to mobile stations to make interference signal measurements on specified channels, the commands also specifying a different averaging time constant for interference measurements than that used for measuring the strength of wanted signals.

Another aspect of the invention comprises mobile stations for receiving commands from networks of a first type specifying the channels on which wanted signals measurements should be made, and an averaging time constant for averaging the measurements, and, alternatively receiving commands from a network of a second type specifying channels on which interfering signals measurements should be made, including a time constant for averaging interference measurements. Another embodiment comprises a mobile station for receiving commands from networks of a first type specifying the channels on which wanted signals measurements should be made, and a measurement repetition interval or periodicity for repeating measurements on each of the specified wanted signal channels, and, alternatively receiving commands from a second type of network specifying channels on which interfering signal measurements shall be made, including a repetition interval or periodicity for repeating interference measurements on each of the specified channels. In any of the above cases, the measurement averaging time constant or periodicity may, alternatively, be implied by being related in a pre-agreed manner to the number of channels specified to be measured.

As will be appreciated by those of skill in this art, the above-described aspects of the present invention in FIG. 4 and FIG. 5 may be provided by hardware, software, or a combination of the above. While various components of mobile terminal 60 have been illustrated in FIG. 4, in part, as discrete elements, they may, in practice, be implemented by a microcontroller including input and output ports and running software code, by custom or hybrid chips, by discrete components or by a combination of the above. For example, memory 68 may be contained within processor 66. Similarly, while various components of communication network 52 have been illustrated in FIG. 5, in part, as discrete elements, they may, in practice, be implemented by a microcontroller including input and output ports and running software code, by custom or hybrid chips, by discrete components or by a combination of the above. For example, memory 86 may be contained within processor 84.

Operations of the present invention will now be described with respect to FIG. 6. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 6:
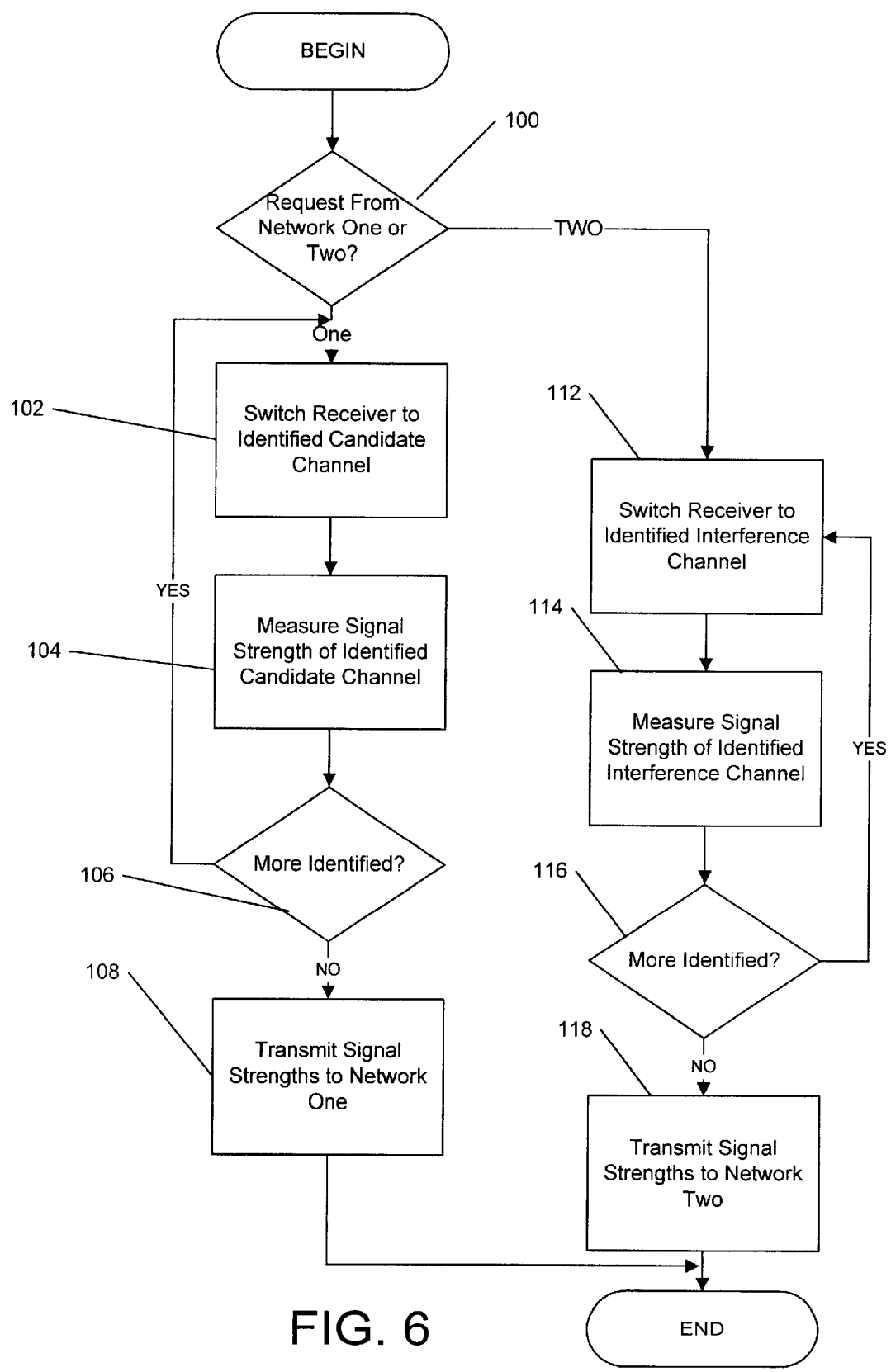
FIG. 6 is a flowchart illustrating operations for an embodiment of the present invention.

Referring now to FIG. 6, operations begin at block 100 with the mobile terminal 60 determining if it has received a request for mobile signal measurements from a first communication network 52 or a second communication network 54. If a request has been received from a first communication network 52, the mobile terminal 60 switches its receiver to the frequency of one of the identified wanted signal candidate channels received from the first communication network 52 (block 102). The mobile terminal 60 then measures the signal strength of the identified candidate channel (block 104). If additional candidate channels have been identified in the request for measurements from the first communication network 52, at block 106, operations return to block 102 to perform the measurements on the next candidate channel from the request. Once signal strength measurements have been generated for all of the requested candidate channels, the signal strengths are transmitted by the mobile terminal 60 to the first communication network 52 (block 108).

If a request was received from a second communication network 54 at block 100, the mobile terminal 60 switches the receiver to the frequency of an identified interference channel listed in the request from the second communication network 54 (block 112). The mobile terminal 60 then measures the signal strength of the identified interference channel (block 114). If additional interference channels were identified for which signal strength measurements are desired at block 116, operations return to block 112 to perform the measurements on the remaining identified interference channels. Once all of the identified interference channels signal strength measurements have been completed, the signal strengths are transmitted by the mobile terminal 60 to the second communication network 54 (block 118).

While the present invention has been described above with respect to operation in two networks, as will be appreciated by those of skill in the art, the present invention may be utilized with greater numbers of networks. As described above, the methods and systems of the present invention provide for mobile terminal operations in both a fixed frequency reuse network and an adaptive channel allocation based network by a single mode mobile terminal. Different signal strength measurements are generated by the mobile terminal for each type of network without the use of dual hardware components. Accordingly, the mobile terminal 60 of the present invention may, in some embodiments, support mobile assisted operations for either network without additional components being included in the terminal.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method for communicating between a mobile terminal and both a first wireless communication network and a second wireless communication network, the method comprising the following steps performed by the mobile terminal:

receiving over a control channel of the first wireless communication network an identification of a candidate channel for handoff;

determining an associated signal strength of the candidate channel;

transmitting the determined associated signal strength of the candidate channel to the first wireless communication network;

receiving over a control channel of the second wireless communication network an identification of a plurality of interference channels;

determining associated signal strengths for the plurality of interference channels; and transmitting the determined associated signal strengths of the plurality of interference channels to the second wireless communication network.

2. The method of claim 1 wherein the step of receiving an identification of a candidate channel comprises the step of receiving an identification of a plurality of candidate channels corresponding to channels used by selected base stations of the first wireless communication system and wherein the step of determining an associated signal strength of the candidate channel comprises the step of determining associated signal strengths of the plurality of candidate channels and wherein the step of transmitting the determined associated signal strength of the candidate channel comprises the step of transmitting the associated signal strengths of the plurality of candidate channels.

3. The method of claim 2 wherein the selected base stations are base stations in the vicinity of a base station of the first wireless communication network which transmitted the identification of a plurality of candidate channels received by the mobile terminal.

4. A method according to claim 3 wherein the first wireless communication network is a GSM network using at least one of fixed frequency re-use or frequency hopping.

5. The method of claim 2 wherein the step of receiving an identification of a plurality of interference channels comprises the step of receiving an identification of a plurality of interference channels corresponding to channels allocated to the second wireless communication network which are currently unused by at least one selected base station of the second wireless communication network.

6. The method of claim 5 wherein said at least one selected base station includes a base station of the second wireless communication network which transmitted the identification of a plurality of interference channels received by the mobile terminal.

7. The method of claim 6 wherein the at least one selected base station of the second wireless communication network comprise base stations in the vicinity of the base station of the second wireless communication network which transmitted the identification of a plurality of interference channels received by the mobile terminal.

8. The method of claim 7 wherein the second wireless communication network is a GSM network using adaptive channel allocation and the first wireless communication network is a GSM network using at least one of fixed frequency re-use or frequency hopping.

9. The method of claim 7 wherein the receiving steps are carried out using a common receiver of the mobile terminal and the determining steps are carried out using a common signal strength measurement circuit of the mobile terminal and the transmitting steps are carried out using a common transmitter of the mobile terminal.

10. The method of claim 2 further comprising the following steps performed by the first wireless communication network:

transmitting the identification of a plurality of candidate channels;

receiving the transmitted associated signal strengths; and selecting one of the selected base stations of the first wireless communication network to provide communication support for the mobile terminal based on the received associated signal strengths.

11. The method of claim 10 wherein the step of selecting comprises the step of selecting a one of the selected base stations of the first wireless communication network having the strongest associated signal strength to provide communications service for the mobile terminal.

12. The method of claim 10 further comprising the following steps performed by the second wireless communication network:

transmitting the identification of a plurality of interference channels;

receiving the transmitted associated signal strengths of the plurality of interference channels; and selecting a channel of the second wireless communication network to provide communications service for the mobile terminal based on the received associated signal strengths of the plurality of interference channels.

13. A communication system, comprising:

a first wireless communication network comprising:

a plurality of base stations;

means for transmitting an identification of a plurality of candidate channels associated with the plurality of base stations;

means for receiving associated signal strengths of the plurality of candidate channels from a mobile terminal; and means for selecting one of the plurality of base stations of the first wireless communication network to provide communication support for the mobile terminal based on the received associated signal strengths of the plurality of candidate channels; and a second wireless communication network comprising:
   means for transmitting an identification of a plurality of interference channels;
   means for receiving associated signal strengths of the plurality of interference channels from the mobile terminal; and
   means for selecting a channel of the second wireless communication network to provide communication support for the mobile terminal based on the received associated signal strengths of the plurality of interference channels; and a mobile terminal comprising:
   means for receiving over a control channel of the first wireless communication network the identification of a plurality of candidate channels associated with the plurality of base stations;
   means for determining the associated signal strengths of the plurality of candidate channels;
   means for transmitting the determined associated signal strengths of the plurality of candidate channels to the first wireless communication network;
   means for receiving over a control channel of the second wireless communication network the identification of a plurality of interference channels;
   means for determining the associated signal strengths of the plurality of interference channels; and
   means for transmitting the associated signal strengths of the plurality of interference channels to the second wireless communication network.

14. The system of claim 13 wherein the means for receiving over a control channel of the first wireless communication network and the means for receiving over a control channel of the second wireless communication network are a common receiver and wherein the means for determining an associated signal strength of the candidate channel and the means for determining associated signal strengths for the plurality of interference channels are a common signal strength measurement circuit and wherein the means for transmitting the determined associated signal strength of the candidate channel and the means for transmitting the determined associated signal strengths of the plurality of interference channels are a common transmitter.

15. The system of claim 14 wherein the means for receiving an identification of a candidate channel comprises means for receiving an identification of a plurality of candidate channels corresponding to channels used by selected base stations of the first wireless communication system and wherein the means for determining an associated signal strength of the candidate channel comprises means for determining associated signal strengths of the plurality of candidate channels and wherein the means for transmitting the determined associated signal strength of the candidate channel comprises means for transmitting the associated signal strengths of the plurality of candidate channels.

16. The system of claim 15 wherein the selected base stations are base stations in the vicinity of a base station of the first wireless communication network which is providing communications service to the mobile terminal.

17. The system of claim 15 wherein the means for receiving an identification of a plurality of interference channels comprises means for receiving an identification of a plurality of interference channels corresponding to channels allocated to the second wireless communication network which are currently unused by at least one selected base station of the second wireless communication network.

18. The method of claim 17 wherein said at least one selected base station includes a base station of the second wireless communication network which transmitted the identification of a plurality of interference channels received by the mobile terminal.

19. The system of claim 18 wherein the at least one selected base station of the second wireless communication network comprises base stations in the vicinity of the base station of the second wireless communication network which transmitted the identification of a plurality of interference channels received by the mobile terminal.

20. The system of claim 19 wherein the means for selecting one of the selected base stations of the first wireless communication network comprises means for selecting a one of the selected base stations of the first wireless communication network having the strongest associated signal strength to provide communications service for the mobile terminal.

21. The system of claim 20 wherein the second wireless communication network is a GSM network using adaptive channel allocation and the first wireless communication network is a GSM network using at least one of fixed frequency re-use or frequency hopping.

* * * * *